Feb. 25, 1964     S. B. ANDERSSON ET AL     3,122,308
CONTROL DEVICES FOR MOTOR-DRIVEN COMPRESSORS
Filed Jan. 27, 1959

Feb. 25, 1964    S. B. ANDERSSON ET AL    3,122,308
CONTROL DEVICES FOR MOTOR-DRIVEN COMPRESSORS
Filed Jan. 27, 1959    2 Sheets-Sheet 2

United States Patent Office 3,122,308
Patented Feb. 25, 1964

3,122,308
CONTROL DEVICES FOR MOTOR-DRIVEN COMPRESSORS
Sven Bertil Andersson, Nacka, and Jan Kristian Holdo, Stockholm, Sweden, assignors to Atlas Copco Aktiebolag, Nacka, Sweden, a corporation of Sweden
Filed Jan. 27, 1959, Ser. No. 789,278
11 Claims. (Cl. 230—138)

This invention relates to a control device for motor-driven compressors. One object of the invention is to provide a device which is quick in action and operates to regulate the delivery pressure of a motor compressor unit within close limits and to cut out the whole delivery of one or more motor compressors forming said unit if a certain delivery pressure in the delivery conduit is exceeded. Another object of the invention is to provide a control device for a unit comprising two motor-driven compressors. A still further object of the invention is to provide a control device for a unit comprising one or more positive displacement compressors, such as screw-type compressors. Another object of the invention is to provide a control device for a motor compressor unit adapted to deliver starting air for an aircraft engine, and particularly for an aircraft jet engine. A still further object of the invention is to provide a control device for a motor compressor unit adapted to provide air for air conditioning of an aircraft cockpit or passenger cabin.

For the above and other purposes we provide the combination with a motor compressor unit of a control device comprising a delivery conduit, means for connecting said delivery conduit with an aircraft, a power-operated exhaust valve communicating with said delivery conduit and capable of venting the whole delivery of said motor compressor unit to the atmosphere, an outlet conduit to the atmosphere from said exhaust valve, a silencer in said outlet conduit, and a pressure responsive apparatus actuated by the pressure in the delivery conduit and operable to admit power to operate said power-operated exhaust valve upon exceeding a certain pressure in said delivery conduit.

Figure 1:
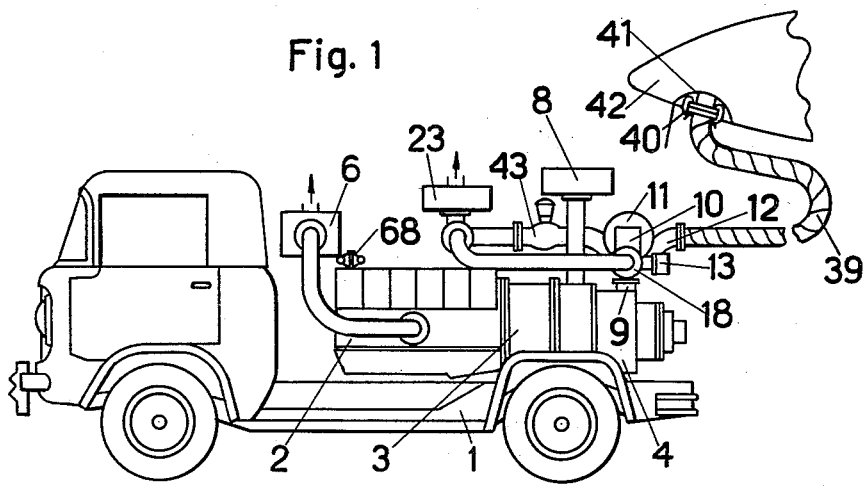
Figure 2:
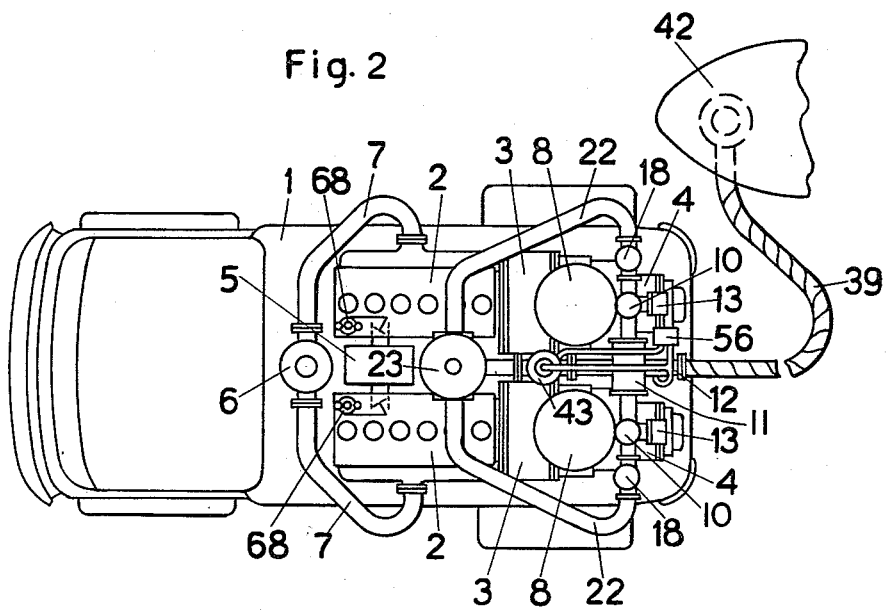
Figure 3:
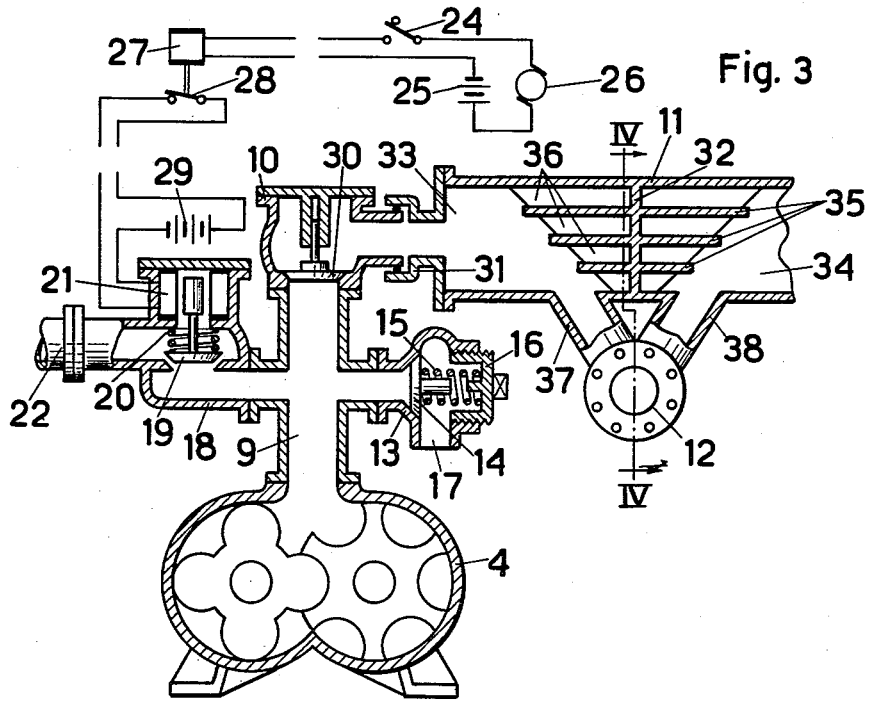
Figure 4:
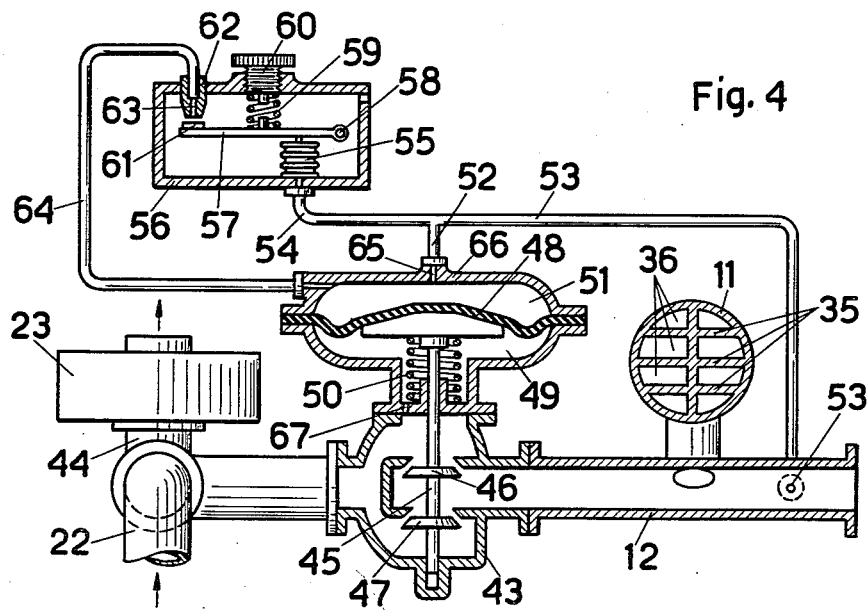

In the accompanying drawings one embodiment of a compressor unit according to the invention is illustrated by way of example, but the invention may be modified in various ways within the scope of the claims. FIG. 1 is a side view of a jeep-mounted motor compressor unit adapted to supply compressed air for starting aircraft jet engines or for providing air for air conditioning of the cockpit or passenger cabin of an airplane or other aircraft. FIG. 2 is a horizontal plan view of the jeep-mounted unit according to FIG. 1. FIGS. 3 and 4 show various details of the unit on a larger scale.

The illustrated embodiment of the invention comprises two motor compressors provided on a mobile frame 1, for instance a jeep, each motor compressor comprising an internal combustion engine 2 coupled to a step-up gear transmission 3 through an automatic centrifugal coupling or the like, and a screw-type compressor 4 driven by the internal combustion engine through the step-up gear. Although the invention is particularly suited for motor compressor units incorporating screw-type compressors the invention could also be employed in connection with motor compressor units comprising one or more positive displacement compressors of other well known types, such as reciprocating and sliding vane compressors, or centrifugal compressors, or the like. 5 indicates an intake air filter for the internal combustion engines and 6 an exhaust silencer to which exhaust pipes 7 from the internal combustion engines are connected. The internal combustion engines are provided with conventional speed governors 68, for instance centrifugal governors, which may be set in conventional way for the desired speed which the governor then keeps constant by regulating the fuel supply to the engine in conventional manner. Each screw compressor is provided with an air intake filter and inlet silencer 8 and the compressed air from each compressor is delivered through a discharge pipe 9 over a check valve 10 to a pressure equalizer 11 which also serves as a silencer and then to a main delivery conduit 12. The discharge pipe 9 communicates with an adjustable safety valve 13 provided with a valve member 14 loaded by a spring 15 the tension of which may be adjusted by means of a screw-threaded plug 16. The safety valve 13 has an outlet opening 17 through which the whole delivery of the compressor may be exhausted. The discharge pipe 9 is further connected to an unloading valve 18 which is provided with a valve member 19 loaded by a spring 20 and operated by a coil 21 which upon energization keeps the valve member 19 lifted and the compressor unloaded. The valve housing 18 is connected through a pipe 22 to a silencer 23 which is common to both compressors 4, 4. 24 indicates a switch by means of which the current from a battery 25 may be closed to an electric starting motor 26 for the engines 2, and upon closing of the switch 24 the current is also closed through a relay 27 which operates a switch 28 with a certain time delay. The switch 28 breaks the current from a battery 29 to the coil 21 of the unloading valve 18 so that said valve is closed by the spring 20.

The check valve 10 contains a valve member 30 which is kept closed by gravity and the check valve communicates with the equalizer 11 through an expansion joint 31. The check valve prevents motoring of one compressor when the other compressor only is operated. The equalizer 11 is divided centrally by a partition 32 into chambers 33 and 34 connected each one to one of the compressors 4 and containing a number of plates 35 of different lengths forming a number of chambers 36 of different lengths for producing a certain pressure equalization and silencing in the compressor delivery conduit. The chambers 33 and 34 communicate with the main delivery conduit 12 through pipes 37 and 38, respectively. The delivery conduit 12 is connected through a hose 39 and a snap coupling 40 to the air intake 41 of an aircraft the nose portion of which is indicated at 42. The main delivery conduit 12 is furthermore connected to a blow-off and bleeder valve 43 which is common for both compressors and which is connected to an exhaust pipe 44 and the silencer 23. The valve housing 43 contains a pneumatically balanced valve member 45 provided with two valve discs 46 and 47 on a common spindle connected to a membrane 48. Said membrane is disposed in the upper portion 66 of the valve housing 43 in which a chamber 49 communicating with the atmosphere through an opening 67 and accommodating a spring 50 is formed on one side of the membrane and a second chamber 51 at the opposite side of the membrane. The chamber 51 is connected through an opening 65 in a pipe 52 to a pipe 53, and the main delivery conduit 12 from the compressor. The chamber 51 and membrane 48 form a means for power operation of the valve member 45. A pipe 54 connects the pipe 53 and conduit 12 to bellows 55 provided in a housing 56. The housing 56 encloses a swingable arm 57 mounted on a pivot 58 and actuated in one direction by the bellows 55 and in the opposite direction by a spring 59 the tension of which may be adjusted by means of a screw-threaded wheel spindle 60. The lever 57 carries a valve member 61 which cooperates with a nozzle 62 having an opening 63 and communicating through a hose 64 with the chamber 51 in the housing 43. The housing 56 and the means provided therein form an amplifier for transforming a small pressure change in the conduit 12 into a strong power impulse for operation of the valve 45.

The operation of the device above described is as follow:

When the hose 39 has been connected to the aircraft by means of the coupling 40 and the operator receives a signal from the aircraft to supply compressed air, for instance for starting the aircraft jet engines, the operator pushes the starter button for the internal combustion engines and thereby closes the switch 24. This starts the engines 2, 2 and the compressors 4, 4, and the air delivered by the compressors at first escapes through the unloading valves 18 and the silencer 23 to the atmoshpere. After a certain period the time delay switch 28 is opened and the coil 21 deenergized so that the valve 19 closes and the compressors start to build up pressure in the delivery conduit 12, the valve 46, 47 being closed due to the absence of pressure in chamber 51 and the action of spring 50. The above mentioned unloading device is not always necessary and we have found that when the motor compressor unit comprises screw compressors the unloading valve 18 may sometimes be dispensed with. The valve 43 is kept closed during the starting period due to the action of the spring 50. The air compressed in the delivery conduit 12 is in the illustrated embodiment used as operating fluid for the membrane 48 and moves the valve discs 46, 47 to more or less open position. Said air, furthermore, acts in the bellows 55 and tends to close the control valve member 61 against the action of the spring 59. During the pressure rise in the delivery conduit 12 the valve 61 at first throttles the opening 63 to a certain degree so that less air escapes from the chamber 51 through the opening 63 than the air supplied through the opening 65, and at a predetermined pressure in the delivery conduit 12 the valve 61 closes the opening 63 causing a quick rise of the air pressure in the chamber 51. The opening 65 is smaller than the opening 63 so that when opening 63 is fully open more air can escape through the opening 63 than the air admitted through the opening 65. When compressed air is delivered to the aircraft and the delivery of the compressors exceeds the air consumption of the aircraft the valve 46, 47 is kept partly open and operates as a bleeder valve. The pressure in the main delivery conduit 12 is then kept constant at a desired value which may be set by adjustment of the tension of the spring 59. When the aircraft engines start the conduit 41 in the aircraft is immediately closed and the pressure rises in the delivery conduit 12 causing the balanced valve 46, 47 to move to fully open position very quickly and the whole delivery of the compressors is then exhausted through the valve 46, 47 and the silencer 23 to the atmosphere. The operator then stops the engines 2, 2 or keeps them idling for further use.

When compressed air is desired for air conditioning or heating of airplane cabins it is usually sufficient to run the screw compressors at a reduced speed.

The twin compressor arrangement illustrated in the drawings and described hereinabove has the advantage that for starting purposes as an emergency one compressor only may be operated for a short interval to produce the whole air volume necessary to start a big jet engine. However, for many jet engines of moderate size a single motor compressor unit is satisfactory, and the invention is not limited to the use of twin compressors even if this arrangement is advantageous and gives an increased safety margin in case one engine of the motor compressor unit should fail.

What we claim is:

1. A surge-free motor-driven compressor device and delivery control system therefor for providing compressed air for use in an aircraft and the like at substantially constant pressures even when the demand for said compressed air is substantially less than the capacity of said device, which comprises in combination a rotory motor-driven air compressor constructed to provide surge-free constant delivery at the outlet thereof, a delivery conduit for conducting compressed air from said compressor and having a discharge outlet for connection to said use, pneumatically balanced exhaust valve means in flow communication with said delivery conduit for venting to the atmosphere part or all of said compressed air from said delivery conduit and including valve members of the pressure-balanced type moveable from a closed position to any of a plurality of open positions and disposed in flow communication with said delivery conduit whereby resultant pressure forces acting on said valve members are equalized in any of said positions thereof, actuating means operatively connected to said exhaust valve means for movement of said valve members gradually from said closed position to any of said open positions and in flow communication with and and responsive to pressure variations in said delivery conduit at a point therein adjacent said discharge outlet and between said exhaust valve means and said outlet, and means for controlling the operation of said actuating means for said gradual movement of said exhaust valve means in response to the demand for said compressed air at said discharge outlet and whereby upon suddent cessation of said demand said exhaust valve means opens suddenly to vent the entire output of said compressor.

2. Compressor apparatus as recited in claim 1 in which said actuating means for said exhaust valve means includes a flexible member in flow communication with air in said delivery conduit at a point therein adjacent said discharge outlet and between said exhaust valve means and said outlet whereby excess pressure in said delivery conduit moves said flexible member to open said exhaust valve means, and wherein said means for controlling the operation of said actuating means includes means for controllably bleeding said excess pressure away from said flexible member for avoiding said movement thereof.

3. Compressor apparatus as recited in claim 2 including pneumatic amplifying means for amplifying the effect on said flexible member of small pressure variations at said point in said delivery conduit, said amplifying means also being in flow communication with said air pressure in sad delivery conduit at said point and controlling said bleeding-off of air from said flexible member.

4. Compressor apparatus as recited in claim 1 in which said exhaust valve means includes a pair of parallelly moveable valve members in said delivery conduit and an exhaust conduit surrounding both said delivery conduit and said valve members and in flow communication with said delivery conduit through said exhaust valve means and with the atmosphere, said valve members being all disposed whereby resultant pressures in said delivery conduit and in said exhaust conduit are equalized on opposite sides of each of said valve members for the pneumatic balancing thereof in all positions thereof.

5. Compressor apparatus as recited in claim 1 wherein said control means includes pneumatic means for amplifying said pressure variations in said delivery conduit and the effect thereof on said actuating means for increasing the sensitivity thereof to small pressure variations for said gradual opening and closing movements of said exhaust valve.

6. Compressor apparatus as recited in claim 1 which also includes baffle plate pressure-equalizing means in flow communication between said air compressor and said delivery conduit and effective on the flow of compressed air therethrough, and silencing means through which compressed air from said exhaust valve means is vented.

7. Compressor apparatus as recited in claim 1 which includes a plurality of air compressors delivering air into a single said delivery conduit, and in which the output of all said compressors is controlled in said delivery conduit by a single said exhaust valve means.

8. Compressor apparatus as recited in claim 7 in which a 1-way check valve is included between each of said compressors and said delivery conduit means for preventing back flow toward each of said compressors.

9. Compressor apparatus as recited in claim 7 which also includes baffle plate pressure-equalizing means interposed in the line of flow between each of said compressors and said delivery conduit means for equalizing flow of compressed air from said compressors into said delivery conduit means.

10. A surge-free motor-driven compressor device and delivery control system therefor for providing compressed air for use in an aircraft and the like at substatnially constant pressures even when the demand for said compressed air is substantially less than the capacity of said device, which comprises in combination a surge-free positive displacement rotary motor-driven air compressor, a delivery conduit for conducting compressed air from said compressor and having a discharge outlet for connection to said use, pneumatically balanced exhaust valve means in flow communication with said delivery conduit for venting to the atmosphere part or all of said compressed air from said delivery conduit, said pneumatic balancing of said exhaust valve means including valve members of the pressure-balanced type moveable from a closed position to any of a plurality of open positions and disposed in flow communication with said delivery conduit whereby resultant pressure forces acting on said valve members are substantially equalized in any of said positions thereof, actuating means operatively connected to said exhaust valve means for movement of said valve members gradually from said closed position to any of said open positions and responsive to pressure variations in said delivery conduit at a point therein adjacent said discharge outlet and between said exhaust valve means and said outlet, said actuating means including a diaphragm in flow communication with said pressure in said delivery conduit at said point, and bleed-off means effecting controllably bleeding pressure from said diaphragm avoiding accumulation of sufficient pressure for actuation of said diaphragm except when flow through said bleed-off means is curtailed.

11. A constant speed internal combustion motor-driven compressor and a delivery control system therefor comprising a delivery conduit from said compressor, a pneumatically balanced exhaust valve communicating with said delivery conduit and capable of opening gradually for venting a part of or the whole delivery of said compressor to the atmosphere, an outlet conduit to the atmosphere from said exhaust valve, a silencer in said outlet conduit, a valve stem in said exhaust valve, a membrane connected to said valve stem, a casing in which said membrane forms a partition, a spring biasing said valve stem in one direction, a chamber in said casing confined by said membrane, a communication between said chamber and said delivery conduit for supplying compressed air to said chamber to counteract said spring, an exhaust conduit communicating with said chamber, a device for controlling the escape of air through said exhaust conduit including a lever, a member on said lever movable to and from an outlet opening in said exhaust conduit to control the amount of air escaping through said conduit, a membrane bellows communicating with said delivery conduit and biasing said lever in one direction and operable to move said member to reduce the escape of air through said exhaust conduit upon increase of pressure in said bellows, and an adjustable spring biasing said lever in opposite direction to said bellows.

References Cited in the file of this patent

UNITED STATES PATENTS

| | | |
|---|---|---|
| 351,043 | Clayton | Oct. 19, 1886 |
| 674,808 | Christensen | May 21, 1901 |
| 738,161 | Christensen | Sept. 8, 1903 |
| 1,296,872 | Spencer | Mar. 11, 1919 |
| 1,616,992 | Ruckstuhl | Feb. 8, 1927 |
| 1,771,413 | McCune | July 29, 1930 |
| 2,339,469 | Emanuel | Jan. 18, 1944 |
| 2,407,013 | Ifield | Sept. 3, 1946 |
| 2,475,701 | Eaton | July 12, 1949 |
| 2,548,472 | Gibson | Apr. 10, 1951 |
| 2,612,908 | Tate et al. | Oct. 7, 1952 |
| 2,648,490 | Messinger et al. | Aug. 11, 1953 |
| 2,675,172 | Anderson | Apr. 13, 1954 |
| 2,745,425 | Jensen | May 15, 1956 |
| 2,806,433 | La Bour | Sept. 17, 1957 |
| 2,864,440 | Cook | Dec. 16, 1958 |
| 2,986,327 | Hunter | May 30, 1961 |

FOREIGN PATENTS

| | | |
|---|---|---|
| 505,163 | Canada | Aug. 17, 1954 |
| 972,613 | France | Aug. 30, 1950 |